United States Patent
Goddard

(10) Patent No.: US 8,930,139 B2
(45) Date of Patent: Jan. 6, 2015

(54) DYNAMICALLY VARIED MAP LABELING

(71) Applicant: TeleCommunication Systems, Inc., Annapolis, MD (US)

(72) Inventor: Mark Goddard, Rancho Santa Margarita, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/911,553

(22) Filed: Jun. 6, 2013

(65) Prior Publication Data

US 2014/0156187 A1 Jun. 5, 2014

Related U.S. Application Data

(60) Provisional application No. 61/662,582, filed on Jun. 21, 2012.

(51) Int. Cl.
G01C 21/36 (2006.01)

(52) U.S. Cl.
CPC .................................. *G01C 21/3673* (2013.01)
USPC ............ 701/516; 701/455; 701/457; 701/533

(58) Field of Classification Search
USPC .......... 701/408, 409, 454, 455, 457, 516, 533
See application file for complete search history.

(56) References Cited

U.S. PATENT DOCUMENTS

| | | |
|---|---|---|
| 4,737,916 A | 4/1988 | Ogawa |
| 4,939,662 A | 7/1990 | Numura |
| 5,223,844 A | 6/1993 | Mansell |
| 5,317,321 A | 5/1994 | Sass |
| 5,389,934 A | 2/1995 | Kass |
| 5,557,254 A | 9/1996 | Johnson |
| 5,636,122 A | 6/1997 | Shah |
| 5,684,951 A | 11/1997 | Goldman |
| 5,689,269 A | 11/1997 | Norris |
| 5,689,809 A | 11/1997 | Grube |
| 5,712,899 A | 1/1998 | Pace, II |
| 5,727,057 A | 3/1998 | Emery |
| 5,758,313 A | 5/1998 | Shah |
| 5,774,824 A | 6/1998 | Streit |
| 5,790,974 A | 8/1998 | Tognazzini |

(Continued)

FOREIGN PATENT DOCUMENTS

| | | |
|---|---|---|
| GB | 2305568 | 4/1997 |
| WO | WO96/36930 | 11/1996 |
| WO | WO2004/074778 | 9/2004 |
| WO | WO2006/039660 | 4/2006 |

OTHER PUBLICATIONS

International Search Report received in PCT/US2013/23470 dated Dec. 16, 2013.

(Continued)

*Primary Examiner* — Russell Frejd
(74) *Attorney, Agent, or Firm* — William H. Bollman

(57) ABSTRACT

Methods for dynamically varying label density and label placement on a map display used in mapping and/or navigation solutions. Label density and label placement on a map display are adjusted dynamically based on: a function class of a road being navigated, a function class of a road to be navigated following an upcoming maneuver, a distance to an upcoming maneuver, and/or a speed a device receiving mapping/navigation services is travelling.

18 Claims, 5 Drawing Sheets

(56) References Cited

U.S. PATENT DOCUMENTS

| | | |
|---|---|---|
| 5,801,700 A | 9/1998 | Ferguson |
| 5,802,492 A | 9/1998 | DeLorme |
| 5,944,768 A | 8/1999 | Ito |
| 5,982,301 A | 11/1999 | Ohta |
| 5,987,381 A | 11/1999 | Oshizawa |
| 6,035,253 A | 3/2000 | Hayahi |
| 6,049,718 A | 4/2000 | Stewart |
| 6,084,951 A | 7/2000 | Smith |
| 6,091,957 A | 7/2000 | Larkins |
| 6,127,945 A | 10/2000 | Mura-Smith |
| 6,138,003 A | 10/2000 | Kingdon |
| 6,148,261 A | 11/2000 | Obradovich |
| 6,163,749 A | 12/2000 | McDonough |
| 6,182,227 B1 | 1/2001 | Blair |
| 6,185,426 B1 | 2/2001 | Alperovich |
| 6,188,957 B1 | 2/2001 | Bechtolsheim |
| 6,192,312 B1 * | 2/2001 | Hummelsheim ............. 701/118 |
| 6,204,844 B1 | 3/2001 | Fumarolo |
| 6,226,367 B1 | 5/2001 | Smith |
| 6,249,742 B1 | 6/2001 | Friederich |
| 6,278,936 B1 | 8/2001 | Jones |
| 6,317,683 B1 * | 11/2001 | Ciprian et al. ............... 701/118 |
| 6,317,684 B1 | 11/2001 | Roeseler |
| 6,321,158 B1 | 11/2001 | DeLorme |
| 6,331,825 B1 | 12/2001 | Ladner |
| 6,353,664 B1 | 3/2002 | Cannon |
| 6,356,836 B1 | 3/2002 | Adolph |
| 6,362,778 B2 | 3/2002 | Neher |
| 6,366,782 B1 | 4/2002 | Fumarolo |
| 6,366,856 B1 | 4/2002 | Johnson |
| 6,377,210 B1 | 4/2002 | Moore |
| 6,397,143 B1 | 5/2002 | Paschke |
| 6,405,033 B1 | 6/2002 | Kennedy, III |
| 6,415,224 B1 | 7/2002 | Wako |
| 6,434,482 B1 | 8/2002 | Oshida |
| 6,441,752 B1 | 8/2002 | Fomukong |
| 6,442,384 B1 | 8/2002 | Shah |
| 6,442,391 B1 | 8/2002 | Johansson |
| 6,459,782 B1 | 10/2002 | Bedrosian |
| 6,466,788 B1 | 10/2002 | Carlsson |
| 6,487,495 B1 | 11/2002 | Gale |
| 6,525,768 B2 | 2/2003 | Obrdovich |
| 6,529,143 B2 | 3/2003 | Mikkola |
| 6,535,743 B1 | 3/2003 | Kennedy, III et al. |
| 6,539,080 B1 | 3/2003 | Bruce |
| 6,549,782 B2 | 4/2003 | Roy |
| 6,563,824 B1 | 5/2003 | Bhatia |
| 6,571,169 B2 | 5/2003 | Miyaki |
| 6,571,174 B2 | 5/2003 | Rigazio |
| 6,587,782 B1 | 7/2003 | Nocek |
| 6,621,423 B1 | 9/2003 | Cooper |
| 6,643,516 B1 | 11/2003 | Stewart |
| 6,661,353 B1 | 12/2003 | Gopen |
| 6,662,016 B1 | 12/2003 | Buckham |
| 6,665,613 B2 | 12/2003 | Duvall |
| 6,665,715 B1 | 12/2003 | Houri |
| 6,674,849 B1 | 1/2004 | Froeberg |
| 6,675,089 B2 | 1/2004 | Hirabayashi |
| 6,678,613 B2 | 1/2004 | Andrews |
| 6,700,505 B2 | 3/2004 | Yamashita |
| 6,721,652 B1 | 4/2004 | Sanqunetti |
| 6,721,716 B1 | 4/2004 | Gross |
| 6,766,174 B1 | 7/2004 | Kenyon |
| 6,771,969 B1 | 8/2004 | Chinoy |
| 6,775,371 B2 | 8/2004 | Elsey |
| 6,801,850 B1 | 10/2004 | Wolfson |
| 6,810,405 B1 | 10/2004 | LaRue |
| 6,816,782 B1 | 11/2004 | Walters |
| 6,819,919 B1 | 11/2004 | Tanaka |
| 6,829,532 B2 | 12/2004 | Obradovich |
| 6,839,630 B2 | 1/2005 | Sakamoto |
| 6,842,696 B2 | 1/2005 | Silvester |
| 6,845,321 B1 | 1/2005 | Kerns |
| 6,853,849 B1 | 2/2005 | Tognazzini |
| 6,859,723 B2 | 2/2005 | Yokota |
| 6,885,874 B2 | 4/2005 | Grube |
| 6,898,516 B2 | 5/2005 | Pechatnikov |
| 6,910,818 B2 | 6/2005 | McLoone |
| 6,925,603 B1 | 8/2005 | Naito |
| 6,941,127 B2 | 9/2005 | Muramatsu |
| 6,944,535 B2 | 9/2005 | Iwata |
| 6,999,875 B2 | 2/2006 | Tu |
| 7,038,590 B2 | 5/2006 | Hoffman |
| 7,043,362 B2 | 5/2006 | Krull |
| 7,058,506 B2 | 6/2006 | Kawase |
| 7,079,863 B2 | 7/2006 | Chikaishi |
| 7,089,110 B2 | 8/2006 | Pechatnikov |
| 7,139,722 B2 | 11/2006 | Perrella |
| 7,142,196 B1 | 11/2006 | Connor et al. |
| 7,142,205 B2 | 11/2006 | Chithambaram |
| 7,167,187 B2 | 1/2007 | Scott |
| 7,171,304 B2 | 1/2007 | Wako |
| 7,202,801 B2 | 4/2007 | Chou |
| 7,266,376 B2 | 9/2007 | Nakagawa |
| 7,286,929 B2 | 10/2007 | Staton |
| 7,496,484 B2 * | 2/2009 | Agrawala et al. ................. 703/2 |
| 7,542,882 B2 * | 6/2009 | Agrawala et al. ................. 703/2 |
| 7,565,157 B1 | 7/2009 | Ortega |
| 7,653,544 B2 | 1/2010 | Bradley |
| 7,660,441 B2 * | 2/2010 | Chen et al. ..................... 382/113 |
| 7,739,033 B2 | 6/2010 | Murata |
| 7,751,614 B2 | 7/2010 | Funakura |
| 7,774,003 B1 | 8/2010 | Ortega |
| 7,786,876 B2 | 8/2010 | Troxler |
| 7,881,730 B2 | 2/2011 | Sheha et al. |
| 7,925,438 B2 | 4/2011 | Lo |
| 8,078,641 B2 * | 12/2011 | Mao et al. ..................... 707/796 |
| 8,112,529 B2 | 2/2012 | Van Den Oord |
| 8,175,806 B2 * | 5/2012 | Kodaira et al. ............... 701/523 |
| 8,264,570 B2 | 9/2012 | Karimoto |
| 8,285,245 B2 | 10/2012 | Ashley |
| 8,301,159 B2 | 10/2012 | Hamynen |
| 8,331,611 B2 | 12/2012 | Johnson |
| 8,332,402 B2 | 12/2012 | Forstall |
| 2001/0015756 A1 | 8/2001 | Wilcock |
| 2001/0016849 A1 | 8/2001 | Squibbs |
| 2002/0032036 A1 | 3/2002 | Nakajima |
| 2002/0059201 A1 | 5/2002 | Work |
| 2002/0069239 A1 | 6/2002 | Katada |
| 2002/0077123 A1 | 6/2002 | Otsuka |
| 2002/0086683 A1 | 7/2002 | Kohar |
| 2002/0130906 A1 | 9/2002 | Miyaki |
| 2002/0169539 A1 | 11/2002 | Menard |
| 2003/0013483 A1 | 1/2003 | Ausems |
| 2003/0014487 A1 | 1/2003 | Iwakawa |
| 2003/0032448 A1 | 2/2003 | Bulthuis |
| 2003/0036848 A1 | 2/2003 | Sheha et al. |
| 2003/0036949 A1 | 2/2003 | Kaddeche |
| 2003/0045327 A1 | 3/2003 | Kobayashi |
| 2003/0060938 A1 | 3/2003 | Duvall |
| 2003/0078054 A1 | 4/2003 | Okuda |
| 2003/0125064 A1 | 7/2003 | Koskinen |
| 2003/0126250 A1 | 7/2003 | Jhanji |
| 2003/0149526 A1 | 8/2003 | Zhou |
| 2003/0151501 A1 | 8/2003 | Teckchandani |
| 2003/0158657 A1 | 8/2003 | Agnew |
| 2003/0165254 A1 | 9/2003 | Chen |
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Cambell |
| 2004/0021567 A1 | 2/2004 | Dunn |
| 2004/0054428 A1 | 3/2004 | Sheha et al. |
| 2004/0058656 A1 | 3/2004 | Chikaishi |
| 2004/0124977 A1 | 7/2004 | Biffar |
| 2004/0186880 A1 | 9/2004 | Yamamoto |
| 2004/0204829 A1 | 10/2004 | Endo |
| 2004/0205517 A1 | 10/2004 | Lampert |
| 2004/0220957 A1 | 11/2004 | McDonough |
| 2004/0229595 A1 | 11/2004 | Laursen |
| 2005/0027445 A1 | 2/2005 | McDonough |
| 2005/0062636 A1 | 3/2005 | Conway |
| 2005/0085999 A1 | 4/2005 | Onishi |
| 2005/0125148 A1 | 6/2005 | Van Buer |

(56) References Cited

U.S. PATENT DOCUMENTS

| | | |
|---|---|---|
| 2005/0153729 A1 | 7/2005 | Logan |
| 2005/0159883 A1 | 7/2005 | Humphries |
| 2005/0219067 A1 | 10/2005 | Chung |
| 2005/0242168 A1 | 11/2005 | Tesavis |
| 2006/0019724 A1 | 1/2006 | Bahl |
| 2006/0041375 A1 | 2/2006 | Witmer |
| 2006/0074547 A1 | 4/2006 | Kaufman |
| 2006/0148488 A1 | 7/2006 | Syrbe |
| 2006/0200359 A1 | 9/2006 | Khan |
| 2006/0268120 A1 | 11/2006 | Funakura |
| 2006/0270421 A1 | 11/2006 | Phillips |
| 2007/0004461 A1 | 1/2007 | Bathina |
| 2007/0032244 A1 | 2/2007 | Counts |
| 2007/0083911 A1 | 4/2007 | Madden |
| 2007/0139411 A1 | 6/2007 | Jawerth |
| 2007/0208687 A1 | 9/2007 | O'Connor |
| 2007/0268392 A1 | 11/2007 | Paalasmaa |
| 2008/0014931 A1 | 1/2008 | Yared |
| 2008/0077324 A1 | 3/2008 | Hatano |
| 2008/0129475 A1 | 6/2008 | Breed |
| 2008/0195314 A1 | 8/2008 | Green |
| 2008/0220747 A1 | 9/2008 | Ashkenazi |
| 2008/0288166 A1 | 11/2008 | Onishi |
| 2009/0113346 A1 | 4/2009 | Wickramasuriya |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |
| 2010/0268848 A1 | 10/2010 | Maurya |
| 2011/0280453 A1* | 11/2011 | Chen et al. .......... 382/113 |
| 2011/0301838 A1 | 12/2011 | Isert |
| 2011/0307947 A1 | 12/2011 | Kariv |
| 2012/0166074 A1 | 6/2012 | Weng |

OTHER PUBLICATIONS

International Search Report received in PCT/US2013/23469 dated Feb. 6, 2014.
Supplementary European Search Report in European Appl. No. 02 75 0138 dated Oct. 13, 2010.
Supplementary European Search Report in European Appl. No. 06839236.4 dated Dec. 6, 2010.
European Search Report mailed Apr. 9, 2009, for EP Application No. 05802548.7 filed Oct. 3, 2005, 14 pages.
Zhao, Y. (1997). *Vehicle Location and Navigation Systems*, Artech House, Injc.: Norwood, MA, 239-263. Chapter 6, pp. 129-136, 158-166, and 229-236; Chapter 10, pp. 239-263. (57 pages total).

* cited by examiner

DYNAMICALLY VARIED MAP LABELING

The present invention claims priority from U.S. Provisional No. 61/662,582, filed Jun. 21, 2012, entitled "Dynamically Varied Map Labeling", the entirety of which is expressly incorporated herein by reference.

BACKGROUND OF THE INVENTION

1. Field of the Invention

This invention relates generally to mapping and navigation, and in particular to location based services (LBS).

2. Background of the Related Art

Conventional navigation solutions obtain a geographic location of a client/user device (e.g. a vehicle, a mobile phone, etc.) and provide route instructions and navigation services (e.g. route calculation, point of interest (POI) lookup, etc.) accordingly. Route instructions provided by a navigation solution indicate a set of maneuvers to be performed at specified locations. A maneuver describes an action that is required to leave one street segment and enter a next street segment along a navigated route.

Conventional navigation solutions exhibit an electronic map display while providing navigation services, to enable users to orient themselves in the real world.

FIG. 3 depicts an illustrative example of a conventional electronic map display.

As depicted in FIG. 3, an electronic map display 300 typically depicts a geographic location of a device 310 and a direction of travel.

Current solutions for providing a map display 300 are not optimal, because they either label roads in a haphazard manner or restrict the roads for which road labels 312a-312e may be shown on a map display 300, to roads that intersect a current route 314. Current solutions also often limit the number of road labels 312a-312e that may be shown on a map display 300 based on map zoom level.

In particular, each zoom level on a conventional map display is assigned a static label density, indicating a maximum number of road labels allowed on the map display at that zoom level. A conventional map display always contains a number of road labels that is less than or equal to a static label density (i.e. a maximum number of road labels) assigned to a current zoom level.

Some existing navigation solutions adjust map zoom level dynamically, in accordance with a speed a device receiving navigation services is travelling. In this case, the number of road labels presented on a map display increases or decreases as is required to adhere to a static label density defined at each zoom level.

FIGS. 4A and 4B depict an illustrative example of road labels on a map display at different zoom levels.

As depicted in FIG. 4A, a map display with a high zoom level 400 is typically limited to fewer road labels than is a map display with a low zoom level 420, shown in FIG. 4B.

For example, a map display with a low zoom level 420, e.g. zoom level 0, may be limited to ≤12 road labels 410a-410i (FIG. 4B), whereas a map display with a high zoom level 400, e.g. zoom level 10, may be limited to ≤3 road labels 430a, 430b (FIG. 4A).

A static label density may cause a map display to look cluttered, or may influence a navigation solution to exhibit only minimal information on a map display, in attempts to avoid clutter. Due to use of a static label density, conventional navigation solutions are forced to present either an uncluttered map display with little information (e.g. road names, city names, etc.) or a cluttered map display with more information.

SUMMARY

The present invention provides methods for dynamically varying the label density (i.e. number of labels) and placement of labels on a map display used in mapping and/or navigation solutions. In accordance with the principles of the present invention, label density and label placement on a map display is adjusted dynamically based on: a function class of a road being navigated, a function class of a road to be navigated following an upcoming maneuver, a distance to an upcoming maneuver, and/or a speed a device receiving mapping/navigation services is travelling.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

Figure 1:
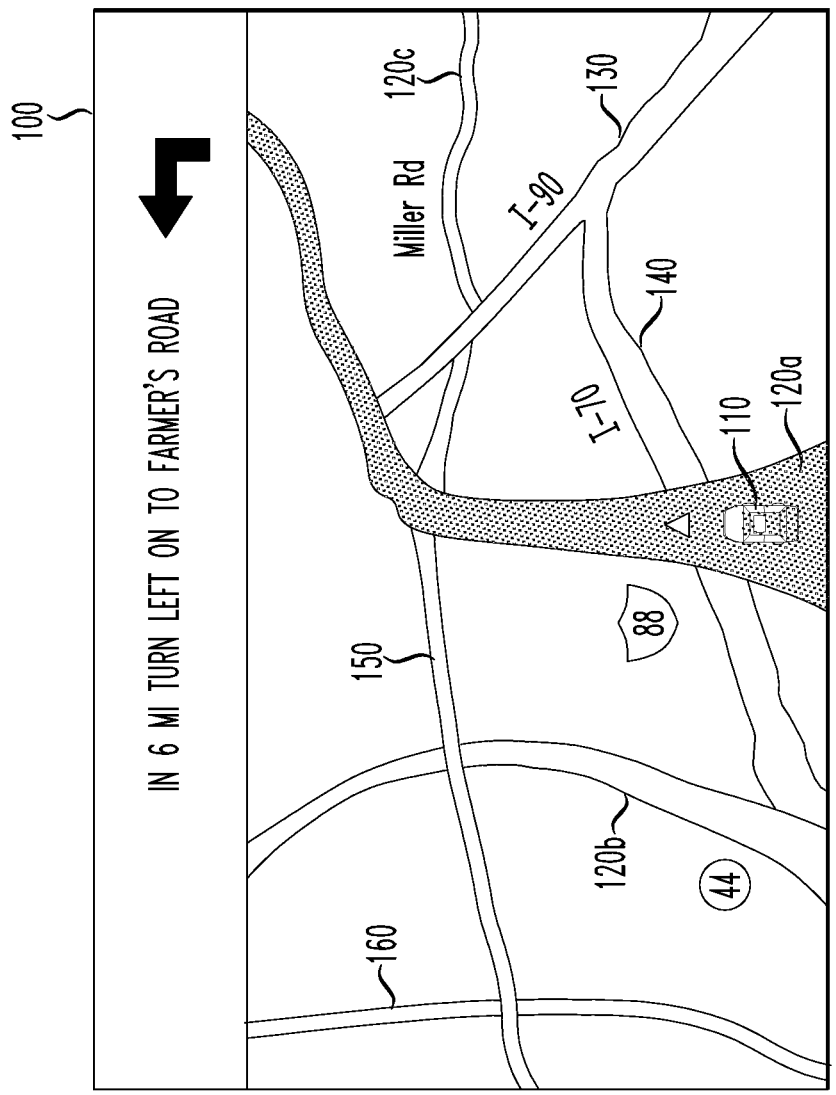
FIG. 1 depicts an illustrative example of a map display that displays road labels based on a function class of a road being navigated, in accordance with the principles of the present invention.

The present invention dynamically varies the label density (i.e. the number of labels) and placement of labels on a map display used in mapping and/or navigation solutions, to better respond to a user's needs.

The present inventor has appreciated that current solutions for providing a map display used in mapping and/or navigation solutions, lack flexibility. In particular, current solutions restrict the roads for which road labels may be shown on a map display, to roads that intersect a navigated route (i.e. a route being currently navigated). Moreover, current mapping and navigation solutions select a static road label density (i.e. a fixed maximum number of road labels) for a map display based on map zoom level. Therefore, only a predetermined number of road labels affiliated with a current zoom level may be presented on a map display at any given time. Such a limitation forces navigation solutions to display either an uncluttered map display with little information, or a cluttered map display with more information.

The present invention dynamically varies the density and placement of road labels on a map display based on: a function class of a road being navigated, a function class of a road to be navigated following an upcoming maneuver (i.e. an action required to leave one street segment and enter a next street segment along a navigated route), a distance to an upcoming maneuver, and/or a speed a device receiving navigation services is travelling.

Some navigable map database suppliers (e.g. NAVTEQ) categorize roadways into function classes based on road function. For instance, roadways categorized as function class 1 roads typically include controlled-access highways connecting major cities. Roadways typically classified as function class 2 roads include highways that connect major cities to smaller cities, at a mobility level that is lower than that of function class 1 roads. Function class 3 roads typically include arterial roads, which provide major routes between minor cities and towns. Roadways typically classified as function class 4 roads include local collector roads that collect traffic from local roads and distribute traffic to arterial roads. Moreover, roadways typically classified as function class 5 roads include local roads with low speed and low traffic volume.

In accordance with the principles of the present invention, a first method for dynamically varying the density and placement of road labels on a map display includes displaying road labels for only those roads that are of a same function class or of a more significant function class as a road that is currently being navigated.

FIG. 1 depicts an illustrative example of a map display that displays road labels based on a function class of a road being navigated, in accordance with the principles of the present invention.

For example, as depicted in FIG. 1, when a device 110 is travelling on an arterial road 120a (a function class 3 road 120a-120c), road labels are presented on a map display 100 for arterial roads (function class 3 roads 120a-120c) and highways (function class 1 130 and function class 2 roads 140), and road labels are not presented on the map display 100 for local collector roads and local roads (function class 4 150 and function class 5 roads 160).

In another method for dynamically varying the density and placement of road labels on a map display, road labels are displayed for only those roads that are of a same function class or of a more significant function class as both a road being currently navigated and a road that is to be navigated following an upcoming maneuver.

Figure 2:
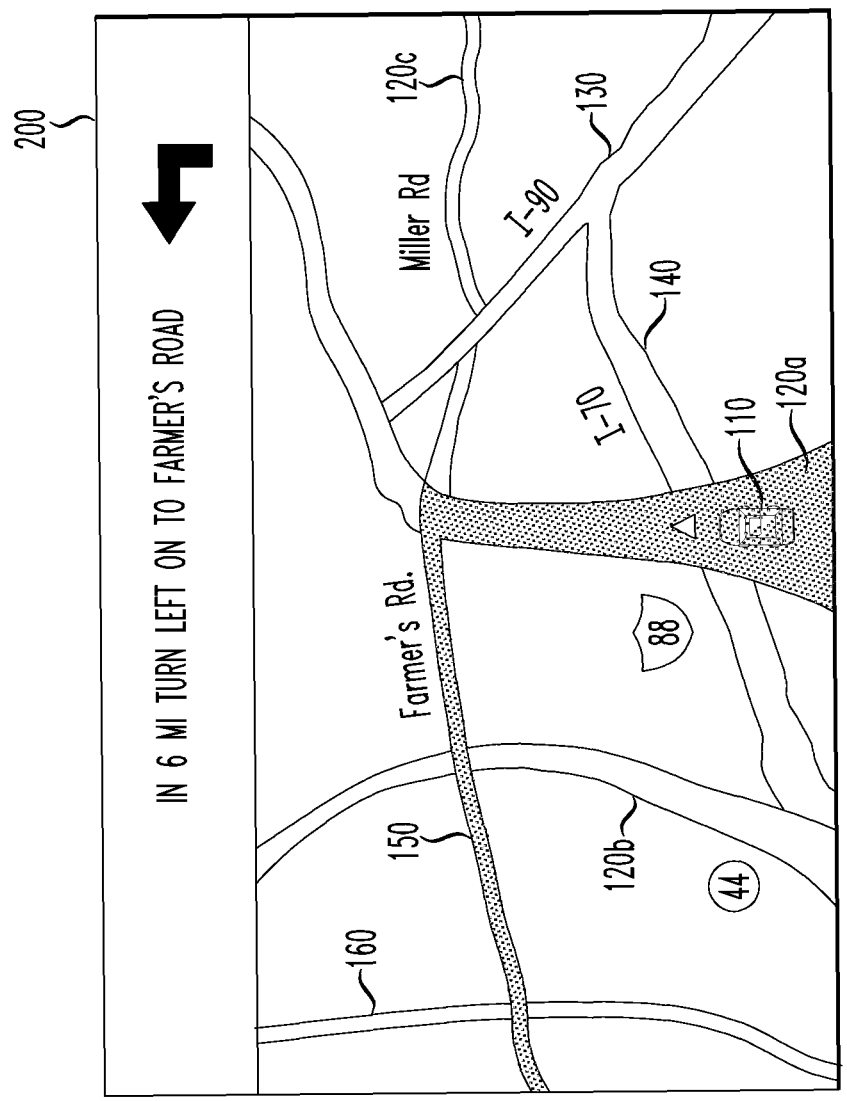
FIG. 2 depicts an illustrative example of a map display that displays road labels based on a function class of a road being navigated and a function class of a road to be navigated following an upcoming maneuver, in accordance with the principles of the present invention.
Figure 3:
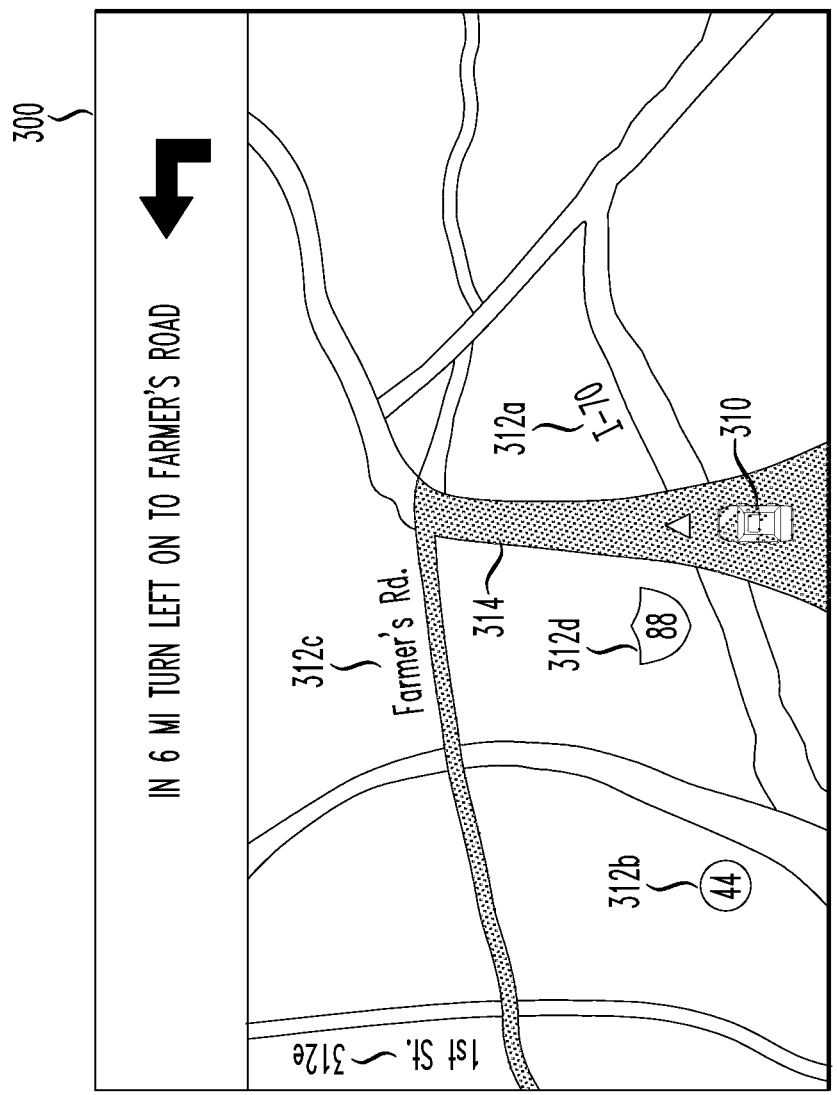
FIG. 3 depicts an illustrative example of a conventional electronic map display.
Figure 4A:
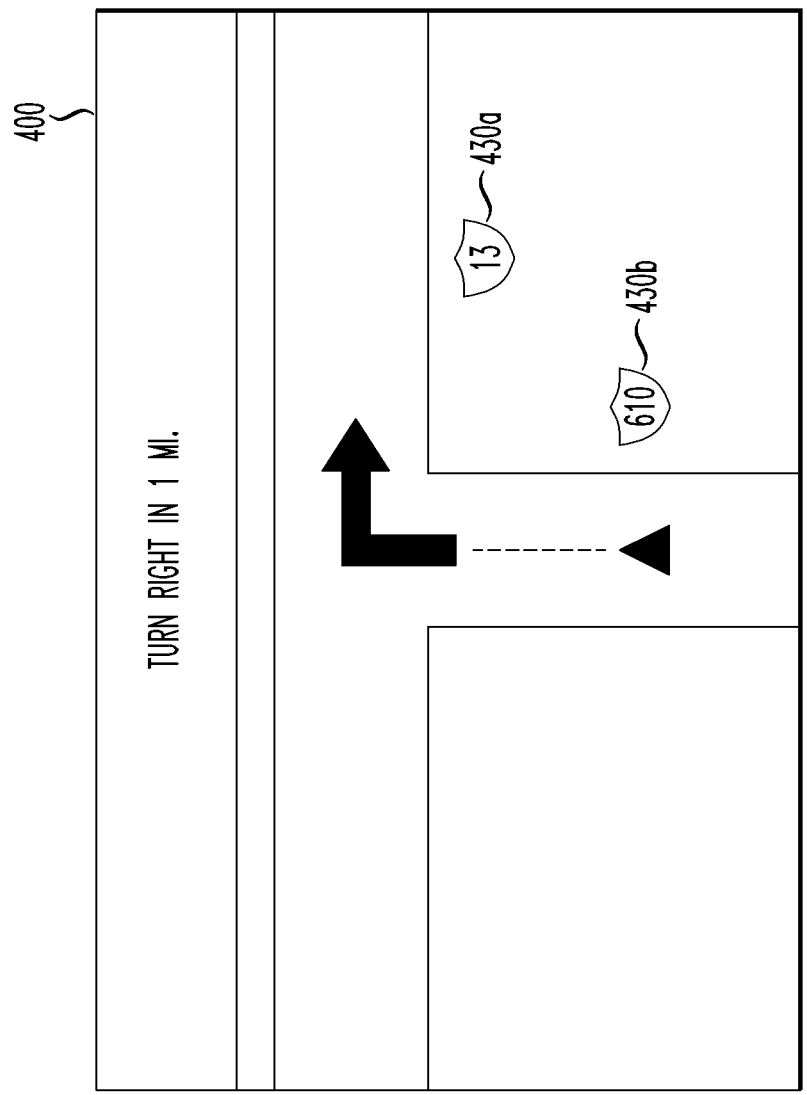
FIGS. 4A and 4B depict an illustrative example of road labels presented on a map display at different zoom levels.
Figure 4B:
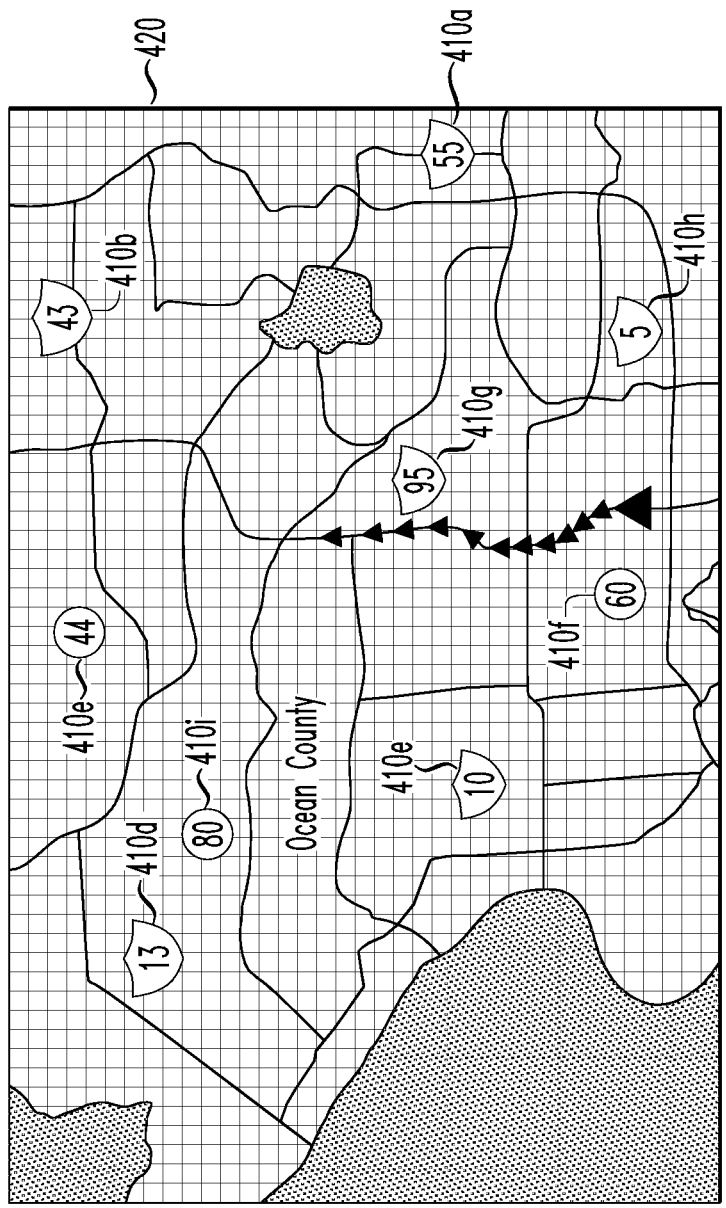

FIG. 2 depicts an illustrative example of a map display that displays road labels based on a function class of a road being navigated and a function class of a road to be navigated following an upcoming maneuver, in accordance with the principles of the present invention.

As depicted in FIG. 2, when a device 110 is travelling on an arterial road 120a (a function class 3 road 120a-120c), and following an upcoming maneuver the device 110 is to be travelling on a local collector road (a function class 4 road 150), then road labels are shown on a map display 200 for highways (function class 1 130 and function class 2 roads 140), arterial roads (function class 3 roads 120a-120c) and local collector roads (function class 4 roads 150), and road labels are not shown on the map display 200 for local roads (function class 5 roads 160).

In another method for dynamically varying the density and placement of road labels on a map display, a map display exhibits road labels for only a predetermined number of roads preceding an upcoming maneuver, that are of a same function class or of a more significant function class as a road being currently navigated and/or a road to be navigated following an upcoming maneuver.

Moreover, in yet another method, a map display includes road labels for only those roads that are within a predetermined distance threshold of an upcoming maneuver, and of a same function class or of a more significant function class as a road being currently navigated and/or a road to be navigated following an upcoming maneuver.

In accordance with the principles of the present invention, another method for dynamically varying road label density and placement of road labels on a map display comprises only displaying road labels for roads that are intersecting a current route. This is a conventional method for displaying road labels on a map display (as shown in FIG. 1).

Another method for dynamically varying road label density and road label placement on a map display includes only exhibiting road labels for roads intersecting a current route that are also of a same function class or of a more significant function class as a road being currently navigated.

Moreover, in yet another method for dynamically varying the density and placement of road labels on a map display, a map display only exhibits road labels for roads intersecting a current route, that are also of a same function class or of a more significant function class as both a road being currently navigated and a road that is to be navigated following an upcoming maneuver.

In another method for dynamically varying the density and placement of road labels on a map display, a map display only exhibits road labels for a predetermined number of roads preceding an upcoming maneuver, that are both intersecting a current route, and of a same function class or of a more significant function class as a road being currently navigated and/or a road that is to be navigated following an upcoming maneuver.

Moreover, another method for dynamically varying road label density and placement of road labels on a map display, includes only exhibiting road labels for roads intersecting a current route, that are within a predetermined distance threshold of an upcoming maneuver, and also of a same function class or of a more significant function class as a road being currently navigated and/or a road to be navigated following an upcoming maneuver.

In yet another method, a map display varies the function class of roads for which road labels are exhibited on a map display based on a current speed of a device receiving navigation services. For example, when a device receiving navigation services exceeds a predetermined speed of travel, road labels for function class 4 and 5 roads are removed from a map display. Likewise, road labels for function class 4 and 5 roads are again added to the map display when the device falls back below the predetermined speed of travel.

The present invention has particular applicability to navigation and mapping solutions and products. Function classes described herein are exemplary. The present invention may be applied to any form of hierarchical road classification system.

While the invention has been described with reference to the exemplary embodiments thereof, those skilled in the art will be able to make various modifications to the described embodiments of the invention without departing from the true spirit and scope of the invention.

What is claimed is:

1. A method for dynamically varying a density of road labels displayed on a given displayed navigational map having a given density of displayed features, comprising:
  dynamically varying a density of road labels displayed on a user device as a navigational map, said density of road labels displayed being varied in number by selection for display based on:
    a function class of a first road being navigated by said user device,
    a function class of a next road to be navigated along a navigated route following an upcoming maneuver,
    a distance to said upcoming maneuver, and
    a speed said user device is travelling.

2. The method for dynamically varying a density of labels displayed on a given displayed navigational map having a given density of displayed features according to claim 1, wherein:
said upcoming maneuver is an action for said user device to leave said first road and enter said next road along said navigated route.

3. The method for dynamically varying a density of labels displayed on a given displayed navigational map having a given density of displayed features according to claim 1, wherein:
said road labels are displayed on said navigational map for only a predetermined number of roads preceding said upcoming maneuver.

4. The method for dynamically varying a density of labels displayed on a given displayed navigational map having a given density of displayed features according to claim 1, wherein:
said road labels are displayed on said navigational map only for roads located within a predetermined distance of said upcoming maneuver.

5. The method for dynamically varying a density of labels displayed on a given displayed navigational map having a given density of displayed features according to claim 1, wherein:
said user device is a vehicle navigation system.

6. The method for dynamically varying a density of labels displayed on a given displayed navigational map having a given density of displayed features according to claim 1, wherein:
said user device is a mobile phone.

7. A method for dynamically varying a density of road labels displayed on a given displayed navigational map having a given density of displayed features, comprising:
dynamically varying a density of road labels displayed on a user device as a navigational map, said density of road labels displayed being varied in number by selection for display based on:
a function class of a first road being navigated by said user device,
a function class of a next road to be navigated along a navigated route following an upcoming maneuver, and
a distance to said upcoming maneuver.

8. The method for dynamically varying a density of labels displayed on a given displayed navigational map having a given density of displayed features according to claim 7, wherein:
said upcoming maneuver is an action for said user device to leave said first road and enter said next road along said navigated route.

9. The method for dynamically varying a density of labels displayed on a given displayed navigational map having a given density of displayed features according to claim 7, wherein:
said road labels are displayed on said navigational map for only a predetermined number of roads preceding said upcoming maneuver.

10. The method for dynamically varying a density of labels displayed on a given displayed navigational map having a given density of displayed features according to claim 7, wherein:
said road labels are displayed on said navigational map only for roads located within a predetermined distance of said upcoming maneuver.

11. The method for dynamically varying a density of labels displayed on a given displayed navigational map having a given density of displayed features according to claim 7, wherein:
said user device is a vehicle navigation system.

12. The method for dynamically varying a density of labels displayed on a given displayed navigational map having a given density of displayed features according to claim 7, wherein:
said user device is a mobile phone.

13. A method for dynamically varying a density of road labels displayed on a given displayed navigational map having a given density of displayed features, comprising:
dynamically varying a density of road labels displayed on a user device as a navigational map, said density of road labels displayed being varied in number by selection for display based on:
a function class of a first road being navigated by said user device,
a function class of a next road to be navigated along a navigated route following an upcoming maneuver, and
a speed said user device is travelling.

14. The method for dynamically varying a density of labels displayed on a given displayed navigational map having a given density of displayed features according to claim 13, wherein:
said upcoming maneuver is an action for said user device to leave said first road and enter said next road along said navigated route.

15. The method for dynamically varying a density of labels displayed on a given displayed navigational map having a given density of displayed features according to claim 13, wherein:
said road labels are displayed on said navigational map for only a predetermined number of roads preceding said upcoming maneuver.

16. The method for dynamically varying a density of labels displayed on a given displayed navigational map having a given density of displayed features according to claim 13, wherein:
said road labels are displayed on said navigational map only for roads located within a predetermined distance of said upcoming maneuver.

17. The method for dynamically varying a density of labels displayed on a given displayed navigational map having a given density of displayed features according to claim 13, wherein:
said user device is a vehicle navigation system.

18. The method for dynamically varying a density of labels displayed on a given displayed navigational map having a given density of displayed features according to claim 13, wherein:
said user device is a mobile phone.

* * * * *